United States Patent [19]

Eklund

[11] 3,722,969

[45] Mar. 27, 1973

[54] BALL AND ROLLER BEARING RETAINER IMPROVEMENT FOR HIGH SPEED OPERATION

[75] Inventor: Phillip R. Eklund, Dayton, Ohio

[73] Assignee: The United States of America as represented by the Secretary of the Air Force

[22] Filed: Jan. 4, 1972

[21] Appl. No.: 215,314

[52] U.S. Cl..............................................308/193
[51] Int. Cl..............................................E16c 33/00
[58] Field of Search.......308/193, 201, 241, 235, 217

[56] References Cited

UNITED STATES PATENTS 3,360,312   12/1967   DeWit et al............................308/241

Primary Examiner—Milton Kaufman
Assistant Examiner—Frank Susko
Attorney—Harry A. Herbert, Jr.

[57] ABSTRACT

A rolling bearing-retainer element having a substrate or base structure manufactured from a free-machining-type of relatively manganese-rich tool and/or die steel that is plated with a deposit of silver after being heat treated and cured under predetermined temperature conditions that ensures the formation of a base surface microstructure that includes a series of manganese sulphide spheroids dispersed throughout and a combined surface microstructure in which a silver sulphide complex is formed at each of the manganese sulphide spheroids to thereby provide a relatively nonyieldable retainer element having substantially less friction and significantly improved resistance to galling, wear and fatigue.

7 Claims, 6 Drawing Figures

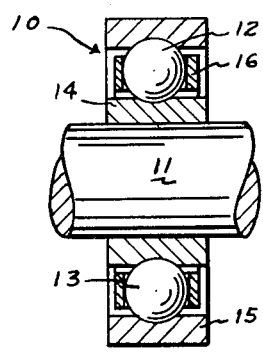
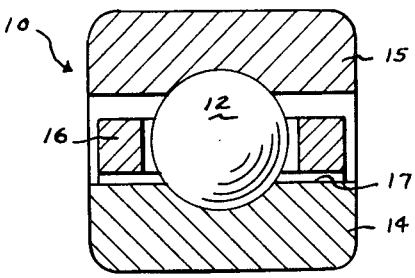
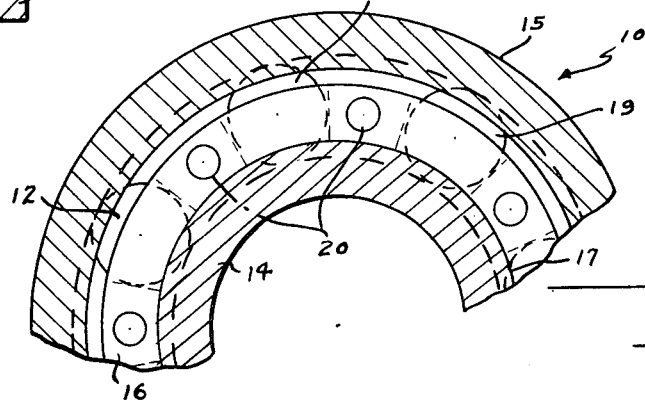
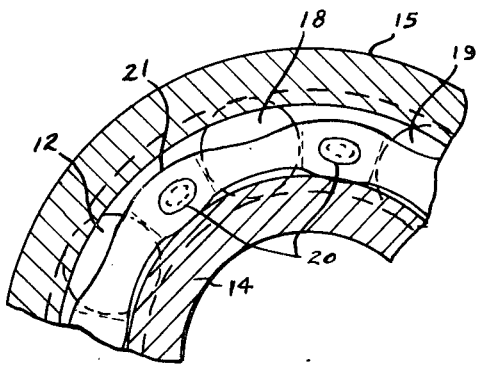
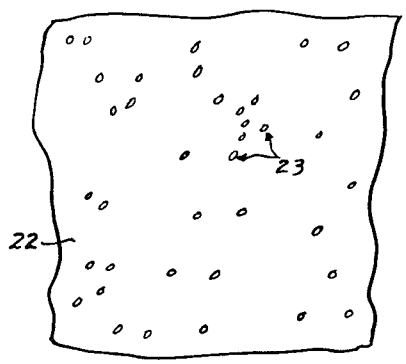
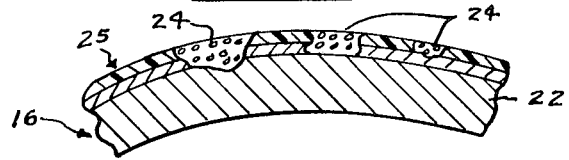

BALL AND ROLLER BEARING RETAINER IMPROVEMENT FOR HIGH SPEED OPERATION

BACKGROUND OF THE INVENTION

This invention relates generally to the field of ball and roller bearing components and, in particular, to an improved bearing-retainer structure.

In the continued development of rolling bearing members for high speed operations and in which relatively low frictional and long-wearing characteristics are naturally desired, the excellent resistance to fatigue and anti-galling features of silver has long been known, although this material has also demonstrated rather erratic frictional behavior. In regard to the latter, during the running of certain automotive engine tests in the 1930's, for example, these engines suffered sudden seizures after a period of running smoothly. Initially, the disassembly thereof revealed no evidence of scoring or galling of the engine-pistons, bearings or other moving parts. Subsequently, however, erratic frictional behavior was found in the connecting rod and crankshaft bearings which had been lined with silver.

Further developments of reciprocating aircraft engines, during World War II, involved the depositing of a silver coating on a steel shell that resulted in a sleeve-type of bearing that appeared to exhibit relatively no evidence of either galling or fatigue when compared with the usual babbitt-lined bearings and when subjected to similar high load conditions. In this connection, to minimize the inherent friction thereof, the silver-coated sleeve bearing was further covered with a flash coating of approximately 0.0004 inches in thickness and consisting of lead, plus 5 percent indium or tin for corrosion resistance. The silver itself was proven effective in supporting relatively heavy loads.

Although, as noted hereinbefore, silver has been found to have rather erratic frictional behavior; nevertheless, its previous use in silver plating ball and roller bearing retainers, made of beryllium-copper, silicon-iron-bronze, or brass, has heretofor enabled the operation of high speed, high temperature ball and roller bearings in jet aircraft engine and accessory applications. However, a major factor involved with, and affecting the prolonged satisfactory high speed operation of bearings is that of retainer balance or, more particularly, retainer unbalance. In this connection, accessory bearings having bores of about 30–40 mm usually employ machined and riveted retainers comprised of the aforementioned materials. Because of the latters' relatively high ductility and low yield strengths, the periphery of the retainer made therefrom has a tendency to deform, bulge, or yield in the area of each rivet as a result of its manufacturing and fabrication. In this manner, high spots are formed on the retainer-periphery, and since such machined and riveted retainers are, in many applications thereof, guided by either the inner or outer bearing-race shoulder, an essentially localized metal-to-metal contact is created therebetween due to the small areas generated by the distortion. The excessive friction, the erratic and non-uniform rotation of the retainer, and the unbalancing and unstable effect thereof on the ball or roller motion becomes quite obvious.

The unique bearing-retainer of the present invention was developed to overcome the aforementioned disadvantages of previously-developed bearing retainers. It accomplishes its objectives by utilizing a base or substrate structure composed of a tool or die steel in unique combination with, and having deposited thereon a layer of silver. In this regard, although, in general, silver-plated hardened steels have been previously suggested, in the present instance, the material to be used for the substrate or base structure is selected from what is referred to as a "free machining" tool or die steel. The latter is one that may be called a "manganese-rich" tool or die steel; i.e., it contains approximately three times as much manganese as sulphur. With this arrangement treated in accordance with the specific and unique teaching of the present invention, a bearing retainer of improved low friction and wear characteristics is formed in the novel manner to be hereinafter further explained in the following summary and detailed description.

SUMMARY OF THE INVENTION

The present invention consists briefly in improving both the frictional, wear and strength characteristics of rolling bearing-retainers, particularly of the riveted type by uniquely combining a retainer manufactured from a tool and/or die steel that is of the free machining-type in that it contains approximately three times as much manganese as sulphur, with a silver deposit on the surface of the retainer that, when heat treated and cured at a specified temperature, combines with, and forms a surface microstructure generally of improved friction, anti-galling and wear characteristics and, in particular, having its strength, and resistance to fatigue and deformation greatly enhanced.

Other objects and advantages of this invention will become readily apparent from the following disclosure, taken in connection with the accompanying drawings, in which:

BRIEF DESCRIPTION OF THE DRAWINGS

FIG. 1 is a partly broken-away, schematic and cross-sectional view, illustrating one type of motor drive shaft and bearing assembly to which the improved retainer element of the present invention may be applied;

FIG. 2 is a relatively enlarged, cross-sectional and fragmentary view, more clearly illustrating details of the retainer element portion of the assembly of FIG. 1;

FIGS. 3 and 4 respectively depict other partly broken-away, schematic and cross-sectional views, showing the unloaded and undeformed, and loaded and deformed conditions of a riveted-type of retainer element utilizable with the assembly of FIG. 1;

FIG. 5 is another schematic depiction, enlarged approximately 1,000 times actual size and in planform, illustrating the novel silver sulphide complex that is dispersed over, and forms the unique and improved surface micro-structure of the present invention; and FIG. 6 is still another partly broken-away, schematic and cross-sectional view, illustrating a portion and showing further details of the improved silver sulphide complex of the novel bearing retainer-surface micro-structure of FIG. 5.

DESCRIPTION OF THE PREFERRED EMBODIMENT

Referring particularly to FIGS. 1 and 2 of the drawings, one type of bearing assembly with which the improvement of the present invention may be used has been indicated generally at 10 as being applied to a shaft at 11 that may represent a motor-driven shaft, for example. Said bearing assembly 10 may comprise a plurality of ball bearing elements, two of which being indicated at 12 and 13, an inner race at 14, and an outer race at 15. Inner and outer races 14, 15 may be comprised of the deep groove type for supporting therewithin the said plurality of ball bearing elements 12, 13, and a machined, two-piece and riveted-type of retainer element, indicated generally at the reference numeral 16, may be used to maintain said ball bearing elements in their properly spaced-apart or separated relation within the respective grooves formed in said inner and outer races 14, 15. In the present case, the retainer element 16 may be guided on the land or shoulder portion, indicated at 17 in FIG. 2, for example, of the inner race 14. Of course, as an alternative, the outer race 15 could be used for this purpose. Also, although the present invention is specifically described with reference to the use of the ball bearing elements 12, 13, it is to be understood that roller bearing elements could just as easily be utilized without departing from the true spirit or scope of the invention.

As is seen particularly in FIG. 3, three of the aforementioned plurality of ball bearing elements are depicted at 12, 18 and 19 as being supported between and in the grooves of the inner and outer races 14 and 15. Ball bearing element 12 is, of course, the same element previously-referred to in connection with FIGS. 1 and 2. When the aforementioned ball bearing-retainer element 16 is constructed from one of the previously-described materials that may include beryllium-copper, silicon-iron-bronze or brass, the latter is rather easily deformed particularly at the area of the rivets, indicated generally at the reference numeral 20 in both FIGS. 3 and 4. FIG. 3 represents the unloaded and undeformed condition of the retainer element 16, whereas, FIG. 4 illustrates the deformation resulting at the aforesaid rivets 20, after the bearing assembly 10, and, in particular, the retainer element 16 thereof has been subjected to bearing operation. The said deformation at the areas of the rivets 20, which occurs because of the relatively high degree of ductility and low yield strengths of the beryllium-copper, silicon-iron-bronze and/or brass-types of retainers, creates a series of bulges or high spots on the periphery of the said retainer element, which bulges or high spots are indicated generally at 21 in the aforementioned FIG. 4. Naturally, with the said retainer element-periphery being supported by the land or shoulder portion 17 of the inner race 14, the above-described formation of the high spots 21, due to the bulging of the retainer element-periphery at the rivets 20 thereof, effect the previously-noted metal-to-metal contact between the said retainer element 16 and the said land or shoulder portion 17 of the inner race 14. As noted hereinbefore, such metal-to-metal contact naturally provides considerable frictional resistance and makes for an erratic, non-uniform and therefore unstable rotation of the retainer element 16 and, of course, for the motion of the ball bearing elements, as at 12, 18 and 19 (FIG. 3).

To substantially eliminate the above-noted high spots 21, which would be formed on the periphery of the retainer element 16, as is illustrated in FIG. 4 and when the material thereof comprises either of the previously-mentioned beryllium-copper, silicon-iron-bronze, or brass, the substrate or base portion 22 (FIG. 6) of the said retainer element 16, may, in accordance with the unique teaching of the present invention, be comprised of what is known in the steel industry as a "free-machining" tool or die steel. As stated hereinbefore, this is a type of steel that contains approximately three times as much manganese as sulphur. An example of such a steel is one identified as an AISI D–2 die steel produced by the Latrobe Steel Co., Latrobe, Pa., as their so-called Olympic FM steel. Heretofore, the latter steel has been found to be quite successful as the material for a ball bearing retainer, particularly when heat treated and tempered or cured to 50 Rockwell C, which is on the recognized industry scale for comparing the relative hardness of the various steels and which actually results from overtempering the steel at a temperature of approximately 1,100° F. With the aforesaid die steel being overtempered to the latter degree of hardness, the subsequent finished machining thereof is greatly facilitated. The heat treated and tempered Olympic FM die steel has been previously determined and found to exhibit a substantially higher yield strength over presently used materials and therefore, when used to form the substrate or base portion 22 of the inventive retainer element 16, greatly resists the previously-described deformation at the area of the rivets 20.

A typical microstructure of the above-described die steel per se, and, in particular, the substrate or base portion 22 of retainer element 16, has been schematically represented in FIG. 5, where a plurality of relatively small manganese sulphide constituents or spheroids provided wherein have been shown generally at the reference numeral 23 as being dispersed throughout the surface structure. It is these manganese sulphide constituents 23 that, under the aforementioned heat treatment, results in the inventive retainer element 16 having a base or substrate microstructure, as at 22, that contribute to the significantly higher yield strength than other more generally used materials and thus substantially resists any deformation under high speed operation, such as for example that previously-described for other structures at the areas of the rivets at 20.

In accordance with the unique teachings of the present invention, the specific and novel improvement of the latter is in combining the previously-selected free machining-type of tool or die steel for use as the base or substrate portion thereof, as at 22 in FIG. 6, with a plating of silver over the surface of said substrate portion 22, as is depicted in the view of the aforementioned FIG. 6. With the said silver-plating being accomplished, a silver sulphide complex is thereby uniquely formed at and with each of the previously-mentioned manganese sulphide spheroids 22 (FIG. 5). This combined manganese, and silver sulphide complex is illustrated generally and schematically at 24 for three areas thereof which have been depicted in partly broken-away form to show the varying degrees of adherence between the silver sulfide constituents of the silver plate, indicated generally at 25, and the manganese sulphide spheriods 23 of the microstructure of the base or substrate portion 22. With this unique combination of the improvement of the present retainer element 16, the heat treated and tempered Olympic FM die steel or, in other words, the base or substrate portion 22 thereof, not only provides a substantially higher yield strength to resist deformation due to riveting but, in addition, naturally provides substantial support for the silver plating 25 so that localized deformation or, in other words, the formation of the high spots at 21 (FIG. 4) in the area of the rivets 20 will not occur and therefore the uniform surface geometry resulting therefrom will greatly improve the high speed properties and motion of bearing-retainer elements, as at 16, made therefrom. Moreover, using the silver plate in unique combination therewith provides a new and improved surface structure on the said base or substrate portion 22 that, because of the formation of the aforesaid silver sulphide complex 24 with the manganese sulphide spheroids 23 of the substrate portion, ensures a combined retainer element-surface structure in which the friction, anti-galling, wear and fatigue characteristics thereof are greatly enhanced.

I claim:

1. In a high speed bearing assembly including an inner race, an outer race and a plurality of rolling bearing members positioned therebetween; a retainer element for supporting and retaining said rolling bearing elements in spaced-apart relation to each other, and further disposed between said inner and outer races; said retainer element comprising a first, retainer element-base or substrate portion composed of a free machining-type of tool or die steel having a surface microstructure incorporating a first, series of strength-producing constituents dispersed throughout and substantially resisting deformation of the retainer element under high-speed operations; and a second, relatively thin, retainer element-outer layer portion deposited on, and rigidly supported by said first, base or substrate portion and composed of a second, series of substantially frictionless constituents arranged in dispersed relation therewithin, and further combining with, the strength-producing constituents of said first, base or substrate portion to thereby collectively produce a combined retainer element-surface microstructure exhibiting a substantially increased resistance to deformation under high-speed operations, and significant reductions in the friction, galling, wear and fatigue characteristics thereof.

2. In a high speed bearing assembly as in claim 1, wherein said first, retainer element-base or substrate portion may be composed of a relatively manganese-rich free machining-type of tool or die steel.

3. In a high speed bearing assembly as in claim 1, where said free machining-type of tool or die steel comprising said first, retainer element-base or substrate portion may further incorporate a 3:1 manganese to sulphur ratio to thereby greatly facilitate its finish machining capability.

4. In a high speed bearing assembly as in claim 3, wherein said relatively manganese-rich free machining-type of tool or die steel may be heat treated and tempered to a predetermined degree of hardness and further formed with a surface microstructure in which said series of strength-producing constituents may comprise a plurality of dispersed manganese sulphide spheroids.

5. In a high speed bearing assembly as in claim 4, wherein said second, relatively thin, retainer element-outer layer portion may comprise a plating of silver.

6. In a high speed bearing assembly as in claim 5, wherein said second, series of substantially frictionless constituents of said silver plate comprises a complex of silver sulphide automatically formed at each of said plurality of manganese sulphide spheroids initially forming the surface microstructure of the first, retainer element-base or substrate portion and thereby subsequently forming a combined surface microstructure consisting of said silver sulphide complex at each of the said base or substrate portion-manganese sulphide spheroids.

7. In a high speed bearing assembly as in claim 6, wherein said retainer element may be comprised of a one-piece member, or a two-piece, riveted member normally tending to deform and produce high spots at the riveted areas thereof under operating conditions; and said plurality of manganese sulphide spheroids forming the surface microstructure of said first, retainer element-base or substrate portion per se exhibiting significantly increased yield strength and thereby substantially inhibiting the said normal tendency of said riveted retainer element to deform at the riveted areas thereof.

* * * * *